United States Patent
Lim et al.

(10) Patent No.: US 12,454,374 B2
(45) Date of Patent: Oct. 28, 2025

(54) AIRCRAFT ENERGY MANAGEMENT CONTROL SYSTEM

(71) Applicant: Joby Aero, Inc., Santa Cruz, CA (US)

(72) Inventors: Edward Lim, Pacifica, CA (US); Joshua Rosenkranz, San Francisco, CA (US); Douglas Famularo, Fredericksburg, VA (US)

(73) Assignee: Joby Aero, Inc., Santa Cruz, CA (US)

( * ) Notice: Subject to any disclaimer, the term of this patent is extended or adjusted under 35 U.S.C. 154(b) by 609 days.

(21) Appl. No.: 17/876,636

(22) Filed: Jul. 29, 2022

(65) Prior Publication Data

US 2023/0064866 A1 Mar. 2, 2023

Related U.S. Application Data

(60) Provisional application No. 63/236,364, filed on Aug. 24, 2021.

(51) Int. Cl.
*B64C 39/02* (2023.01)
*B64U 10/13* (2023.01)
(Continued)

(52) U.S. Cl.
CPC ............. *B64U 10/13* (2023.01); *G05D 1/101* (2013.01); *B64U 2101/20* (2023.01); *B64U 2201/10* (2023.01)

(58) Field of Classification Search
CPC ............... B64U 10/13; B64U 2101/20; B64U 2201/10; G05D 1/101; G05D 1/0858; B64C 13/18
See application file for complete search history.

(56) References Cited

U.S. PATENT DOCUMENTS

2006/0208136 A1* 9/2006 Cook .................... B64G 1/005
  244/171.3
2008/0161983 A1* 7/2008 Salesse-Lavergne ........................
  G05D 1/0669
  701/8
(Continued)

FOREIGN PATENT DOCUMENTS

EP  3388346 A1 * 10/2018 ............. B64D 31/00
FR  2912243 A1 *  8/2008 ............. G01C 23/00

OTHER PUBLICATIONS

Machine Translation: FR-2912243-A1 (Year: 2008).*
(Continued)

*Primary Examiner* — Anne Marie Antonucci
*Assistant Examiner* — Connor L Knight
(74) *Attorney, Agent, or Firm* — Dority & Manning, P.A.

(57) ABSTRACT

A method includes generating, in a normal mode, an aircraft power setpoint and an aircraft pitch setpoint based on a desired airspeed setpoint and a desired altitude setpoint. The method includes transitioning from the normal mode to an underpower mode when the aircraft is unable to maintain the desired airspeed setpoint. The method includes setting, in the underpower mode, the aircraft power setpoint to a full power setting, generating, in the underpower mode, the aircraft pitch setpoint based on the desired altitude setpoint, and transitioning from the underpower mode to an underspeed mode when the aircraft airspeed is less than an airspeed threshold value while the aircraft power setpoint is set to the full power setting. The method includes maintaining, in the underspeed mode, the aircraft power setpoint at the full power setting and generating, in the underspeed mode, the aircraft pitch setpoint based on the desired airspeed setpoint.

22 Claims, 10 Drawing Sheets

(51) Int. Cl.
  *G05D 1/00* (2006.01)
  *G05D 1/10* (2006.01)
  *B64U 101/20* (2023.01)

(56) References Cited

U.S. PATENT DOCUMENTS

| | | | | |
|---|---|---|---|---|
| 2013/0030607 | A1* | 1/2013 | Schulte | G05D 1/0816 |
| | | | | 701/2 |
| 2016/0176510 | A1* | 6/2016 | Vallart | B64C 13/0421 |
| | | | | 244/230 |
| 2017/0008625 | A1* | 1/2017 | Olm | B64U 30/26 |
| 2017/0323571 | A1* | 11/2017 | Lissajoux | G01C 23/005 |
| 2018/0304993 | A1* | 10/2018 | Offredi | B64D 11/00 |
| 2019/0047715 | A1* | 2/2019 | Hedrick | B64D 31/10 |
| 2020/0348694 | A1* | 11/2020 | Ceparu | B64C 13/18 |
| 2021/0088356 | A1* | 3/2021 | Glomski | G08G 5/54 |

OTHER PUBLICATIONS

Machine Translation: EP-3388346-A1 (Year: 2018).*
Autopilot—Wikipedia page. Page is dated Dec. 14, 2019. Page was accessed on Sep. 1, 2022 at: https://web.archive.org/web/20191214034146/https://en.wikipedia.org/wiki/Autopilot.
Autothrottle—Wikipedia page. Page is dated Dec. 14, 2019. Page was accessed on Sep. 1, 2022 at: https://web.archive.org/web/20191214014813/https://en.wikipedia.org/wiki/Autothrottle.
Fadec—Wikipedia page. Page is dated Dec. 14, 2019. Page was accessed on Sep. 1, 2022 at: https://web.archive.org/web/20191214015256/https://en.wikipedia.org/wiki/FADEC.
Jimenez, P.; Lichota, P.; Agudelo, D.; Rogowski, K. Experimental Validation of Total Energy Control System for UAVs. Energies 2020, 13, 14. Available at https://doi.org/10.3390/en13010014. Published Dec. 18, 2019.

* cited by examiner

AIRCRAFT ENERGY MANAGEMENT CONTROL SYSTEM

CROSS-REFERENCE TO RELATED APPLICATION

This application claims the benefit of U.S. Provisional Application No. 63/236,364, filed on Aug. 24, 2021. The disclosure of the above application is incorporated herein by reference in its entirety.

FIELD

The present disclosure relates to aircraft control systems.

BACKGROUND

An aircraft control system may include flight controls and one or more flight computers that may control aircraft actuators to provide responses to pilot input on the flight controls. For example, the aircraft control system may interpret a pilot's inputs and actuate control surface positions required to achieve the pilot's desired intentions. Some aircraft may include an autopilot system that may control the path of the aircraft without constant pilot input. Some aircraft may also include an autothrottle that controls the power delivered by the engines. An autonomous aircraft may fly under control of automatic aircraft control systems that may not require intervention from a pilot.

SUMMARY

In one example, a non-transitory computer-readable medium comprises computer-executable instructions configured to cause one or more processing units of an aircraft to generate, in a normal mode, an aircraft power setpoint and an aircraft pitch setpoint based on a desired airspeed setpoint and a desired altitude setpoint. The aircraft power setpoint controls aircraft engine power output. The aircraft pitch setpoint controls aircraft pitch. The instructions are further configured to transition from the normal mode to an underpower mode when the aircraft is unable to maintain the desired airspeed setpoint. The instructions are further configured to set, in the underpower mode, the aircraft power setpoint to a full power setting, generate, in the underpower mode, the aircraft pitch setpoint based on the desired altitude setpoint, and transition from the underpower mode to an underspeed mode when the aircraft airspeed is less than an airspeed threshold value while the aircraft power setpoint is set to the full power setting. The instructions are further configured to maintain, in the underspeed mode, the aircraft power setpoint at the full power setting and generate, in the underspeed mode, the aircraft pitch setpoint based on the desired airspeed setpoint.

In one example, a method comprises generating, in a normal mode, an aircraft power setpoint and an aircraft pitch setpoint for an aircraft based on a desired airspeed setpoint and a desired altitude setpoint. The aircraft power setpoint controls aircraft engine power output. The aircraft pitch setpoint controls aircraft pitch. The method further comprises transitioning from the normal mode to an underpower mode when the aircraft is unable to maintain the desired airspeed setpoint. The method further comprises setting, in the underpower mode, the aircraft power setpoint to a full power setting, generating, in the underpower mode, the aircraft pitch setpoint based on the desired altitude setpoint, and transitioning from the underpower mode to an underspeed mode when the aircraft airspeed is less than an airspeed threshold value while the aircraft power setpoint is set to the full power setting. The method further comprises maintaining, in the underspeed mode, the aircraft power setpoint at the full power setting and generating, in the underspeed mode, the aircraft pitch setpoint based on the desired airspeed setpoint.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
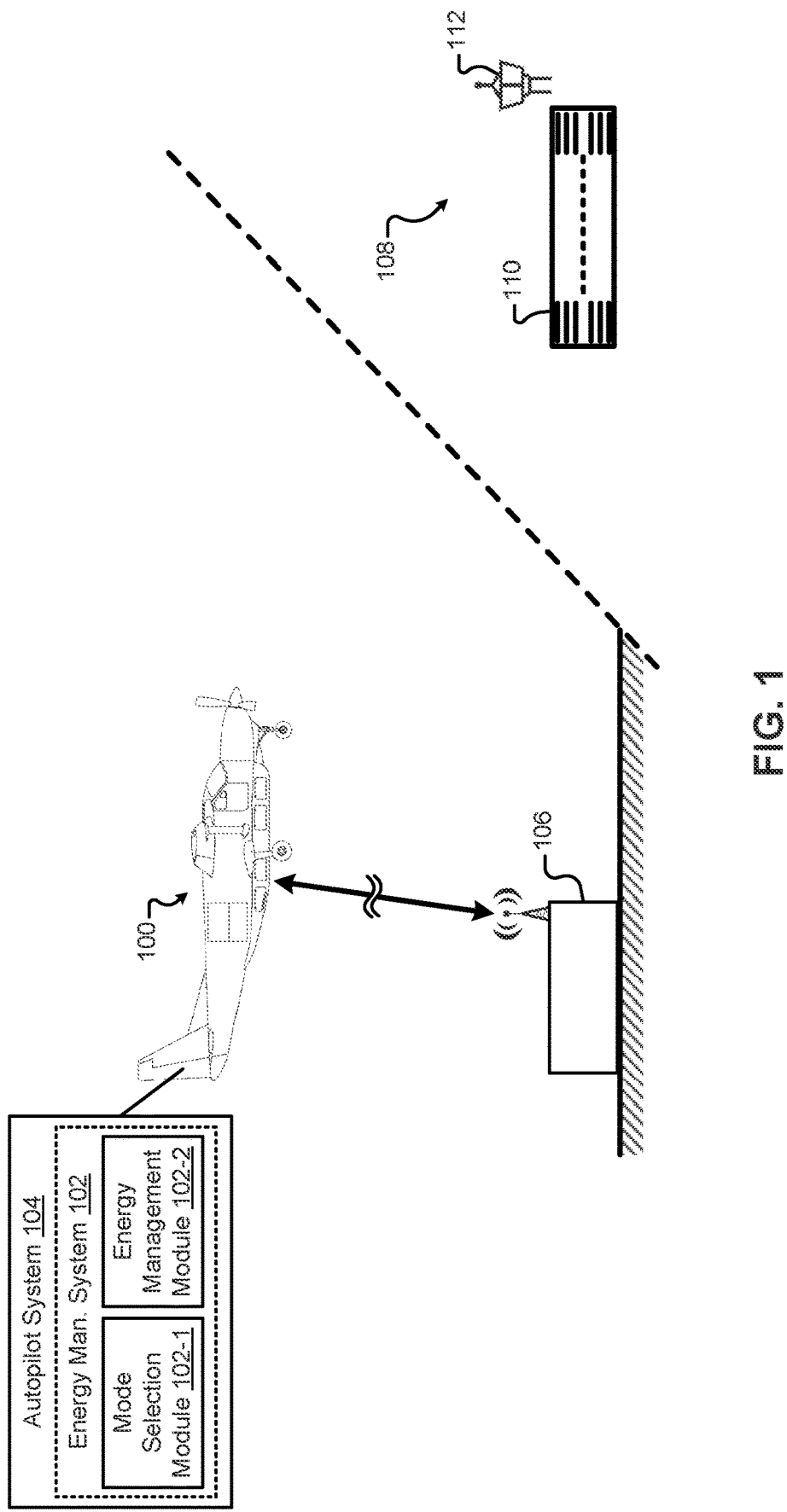
FIG. 1 illustrates an environment that includes an aircraft that implements an energy management control system of the present disclosure.

The environment of FIG. 1 includes an aircraft 100 that may implement an energy management control system 102 ("energy management system 102") of the present disclosure. The energy management system 102 may be implemented by an autopilot system 104 (e.g., see FIGS. 1-3). For example, the energy management system 102 (e.g., autopilot) may include, in part, a mode selection module 102-1, an energy management module 102-2, an airspeed error module 102-3, and an altitude error module 102-4 (e.g., see FIG. 1 and FIGS. 7-8). Although the energy management system 102 may be implemented by the autopilot system 104, the energy management system 102 may be implemented by one or more additional/alternative aircraft computing systems.

The energy management system 102 may handle a variety of energy management scenarios, which may occur when the aircraft 100 does not meet desired setpoints, such as a desired airspeed setpoint and/or a desired altitude setpoint. In some cases, energy management scenarios may be caused by aircraft propulsion issues (e.g., mechanical, electrical, and/or software issues).

Example energy management scenarios described herein may be referred to as an "underpower scenario" and an "underspeed scenario." In an underpower scenario, the aircraft 100 may be unable to maintain level flight at a desired airspeed setpoint. For example, an underpower scenario may occur when the aircraft 100 is unable to track/maintain an airspeed setpoint (e.g., a desired airspeed) at a full power setting (e.g., full throttle). In an underspeed scenario (e.g., an off-nominal energy management scenario), the aircraft 100 may be unable to maintain level flight above a minimum airspeed threshold (e.g., at or near a stall airspeed). For example, an underspeed scenario may occur when the aircraft 100 is unable to maintain greater than a minimum speed threshold at a full power setting (e.g., full throttle).

The energy management system 102 may implement a control scheme that swiftly responds to the energy management scenarios and transitions between the energy management scenarios. For example, the energy management system 102 may operate in, and transition between, one of three modes. The three modes may be referred to herein as a normal mode, an underpower mode, and an underspeed mode. During normal operation, the aircraft 100 may track airspeed and altitude setpoints. For example, during normal operation, the energy management system 102 may use power (e.g., throttle) to reduce total energy error and use pitch to reduce error in energy balance between kinetic energy and potential energy.

The energy management system 102 may transition from the normal mode to the underpower mode in response to detecting normal-to-underpower transition conditions. For example, while operating in normal mode, the energy management system 102 may transition to the underpower mode in response to the aircraft 100 being unable to meet a desired airspeed setpoint. During underpower operation, the energy management system 102 may maximize total energy by commanding full power (e.g., full throttle) and commanding pitch to track altitude. This may allow the aircraft 100 to maintain level flight while tracking as close as possible to the desired airspeed setpoint. The energy management system 102 may transition back to normal mode when the aircraft 100 is able to maintain the desired airspeed setpoint.

The energy management system 102 may transition from the underpower mode to the underspeed mode in response to detecting underpower-to-underspeed transition conditions. For example, while operating the in the underpower mode, the energy management system 102 may transition to the underspeed mode in response to the aircraft 100 being unable to exceed a minimum airspeed threshold (e.g., a stall speed). During underspeed operation, to prevent a stall scenario, the energy management system 102 may disregard altitude tracking and focus on achieving an airspeed safely above a minimum airspeed threshold (e.g., stall speed). For example, the energy management system 102 may command full power and give up altitude to maintain greater than the minimum airspeed threshold. The energy management system 102 may transition back to the underpower mode when the aircraft 100 is able to exceed the minimum airspeed threshold, begin gaining altitude, and/or reach an altitude setpoint.

In some implementations, in the underspeed mode, the desired airspeed setpoint may be set to a value that is a threshold amount greater than a stall speed (e.g., a few knots above the stall speed). Setting the desired airspeed setpoint a threshold amount greater than a stall speed (e.g., a minimum speed) may cause the autopilot to minimize altitude loss while maintaining a safe speed, since a higher desired airspeed setpoint may cause a higher vertical descent rate. With reference to FIG. 10C, a true airspeed setpoint ($TAS_{SP}$) may be set to a value that is a threshold amount greater than a stall speed (e.g., a few knots above stall speed). In some implementations, the stall speed may depend on flap position. As such, in some implementations, the desired airspeed setpoint may be set based on the flap position.

The control strategy for dealing with the energy management scenarios described herein may enhance safety and performance beyond other control approaches. Additionally, the control strategy of switching between different modes (e.g., normal, underpower, and underspeed) may ensure that highest priority concerns are handled first. Furthermore, the control strategy may be implemented by logic that is easier to comprehend than other control schemes, which may prove beneficial for certification.

In some cases, desired values may be referred to herein as setpoint values or desired setpoint values. For example, a desired airspeed value may also be referred to as an airspeed setpoint value or a desired airspeed setpoint value. As another example, a desired altitude value may be referred to as an altitude setpoint value or a desired altitude setpoint value. In some cases, actual values may refer to measured values that are measured/calculated by the aircraft systems.

The environment of FIG. 1 includes a ground control station 106 (GCS 106) and a destination airport 108 that includes a runway 110. In some implementations, the aircraft 100 may communicate with the GCS 106 via a data connection, a radio relay, or other communication channel. In some implementations, a remote operator (e.g., a remote pilot) in the GCS 106 may monitor/control the aircraft 100. For example, a remote operator (e.g., a remote pilot) in the GCS 106 may send flight plans/commands to the aircraft 100 and receive data from the aircraft 100 and other sources. In some cases, the GCS 106 may be referred to as an aircraft operations center (AOC). In some cases, the remote operator may be referred to as a remote pilot, depending on the operator's qualifications and responsibilities. In some implementations, the aircraft 100 may communicate with an air traffic control (ATC) facility 112 (e.g., an ATC tower) at the destination airport 108.

Figure 2:
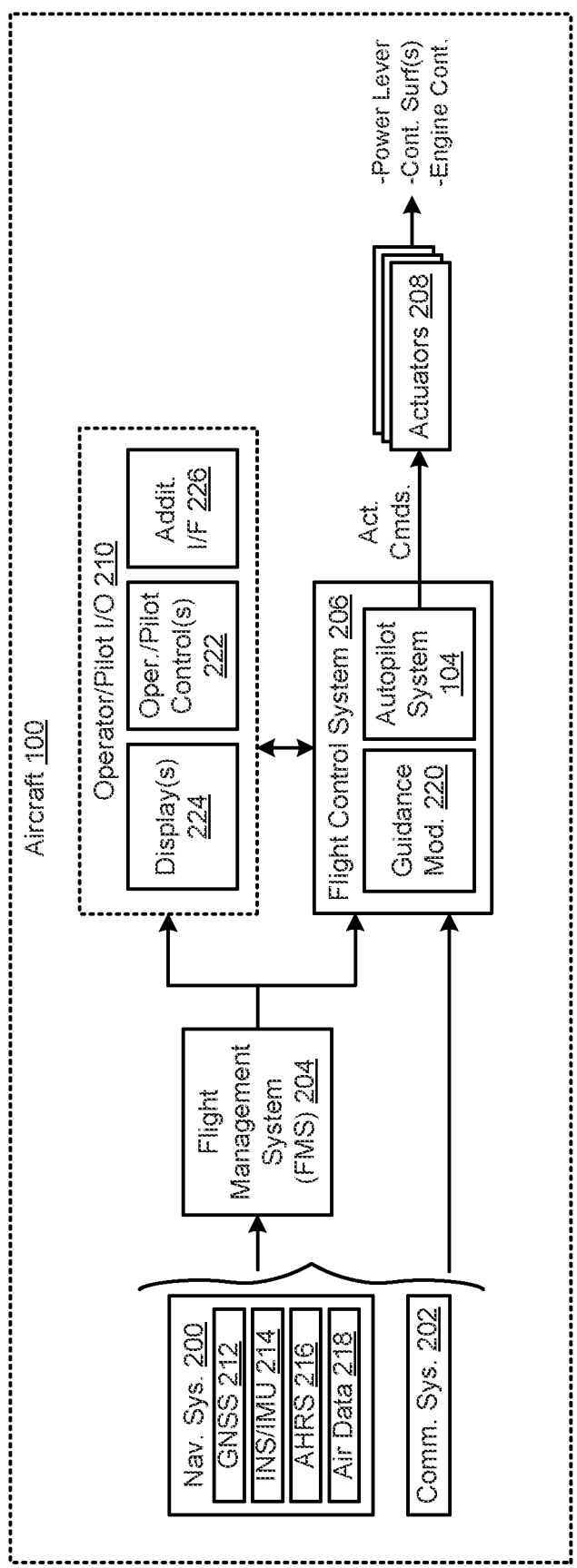
FIGS. 2-3 illustrate functional block diagrams of an example aircraft (e.g., an unmanned aircraft) including an autopilot system that implements an energy management system.
Figure 3:
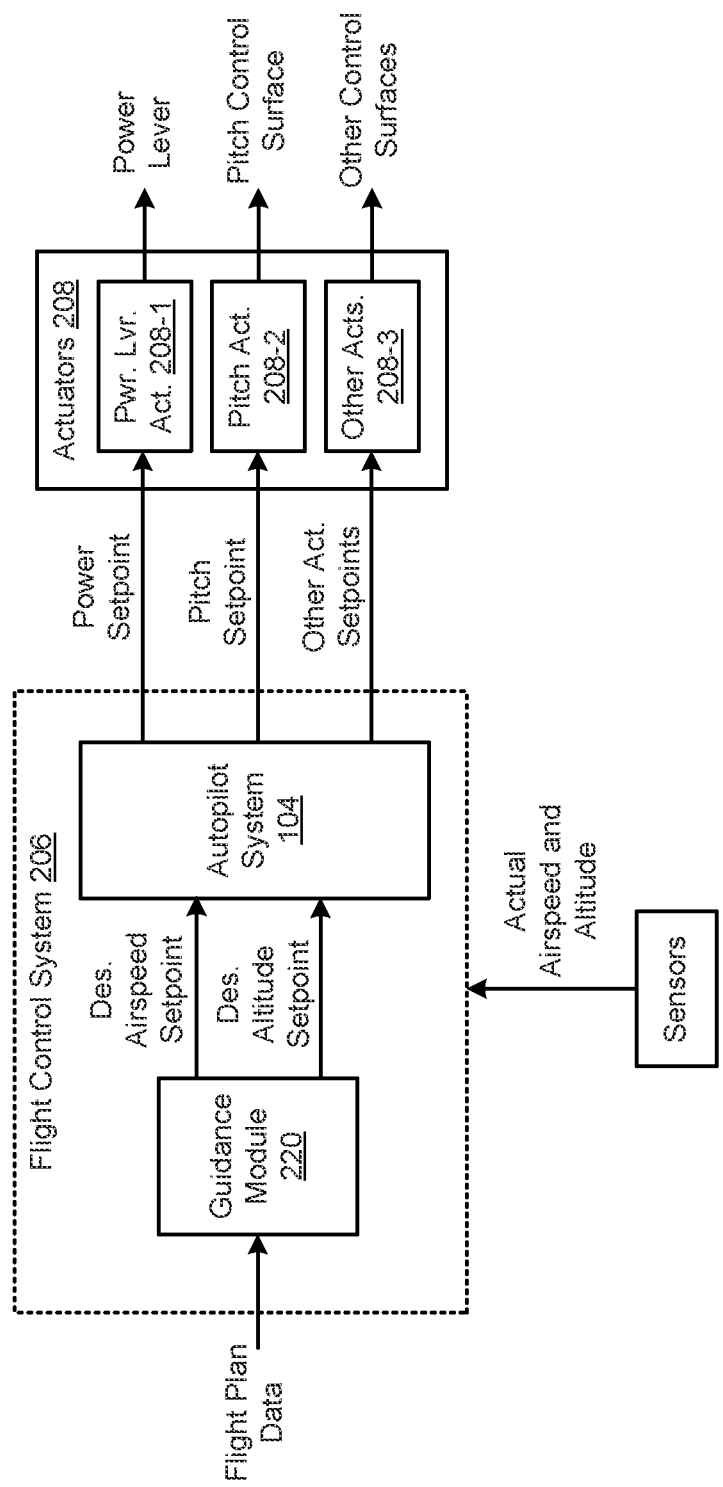

FIGS. 2-3 illustrate functional block diagrams of an example aircraft 100 (e.g., an unmanned aircraft) including an autopilot system 104 that implements an energy management system 102. The aircraft 100 of FIG. 2 includes: 1) navigation systems 200, 2) communication systems 202, 3) a flight management system 204 (FMS 204), 4) a flight control system 206, 5) actuators 208, and 6) operator/pilot input/output (I/O) 210. Although the aircraft 100 may include operator/pilot I/O 210 in some implementations, the aircraft 100 may be operated as an unmanned aircraft. In some implementations, the aircraft 100 may not include operator/pilot I/O, such as when the aircraft 100 is an autonomous aircraft. Although the energy management system 102 may be implemented by an autopilot system 104, some features of the energy management system 102 may be used when the aircraft 100 is under manual operator/pilot control.

The aircraft 100 may include a navigation system 200 that generates navigation data. The navigation data may indicate the location, altitude, velocity, heading, and attitude of the aircraft 100. The navigation system 200 may include a Global Navigation Satellite System (GNSS) receiver 212 that determines the latitude and longitude of the aircraft 100. In some implementations, the navigation system 200 may include an inertial navigation system (INS) 214 that may include an inertial measurement unit (IMU) that provides rotational orientation data (e.g., attitude data) including pitch, roll, yaw, and attitude rate data (e.g., pitch rate, roll rate, and yaw rate). In some implementations, the navigation system 200 may include an attitude and heading reference system (AHRS) 216 that may provide attitude and heading data for the aircraft 100. The navigation system 200 may include an air data system 218 (e.g., a Pitot-static tube, air data computer, etc.) that may provide airspeed, angle of attack, sideslip angle, altitude, and altitude rate information. The navigation system 200 may include a radar altimeter and/or a laser altimeter to provide Above Ground Level (AGL) altitude information. In some implementations, the navigation system 200 may include an instrument landing system (ILS). In some implementations, the navigation system 200 may also include other features, such as differential GPS, Real-Time Kinematics (RTK) GPS, and/or a ground-based augmentation system for aircraft landing (GBAS).

The aircraft 100 may include one or more communication systems 202. For example, the aircraft 100 may include one or more satellite communication systems, one or more ground communication systems, and one or more air-to-air communication systems. In some implementations, the communication systems 202 may form data links. In some implementations, the communication systems 202 may receive a flight plan data structure from the GCS 106 and/or the ATC 112. In some implementations, the communication systems 202 may transmit a flight plan data structure to the GCS 106 and/or the ATC 112. Additionally, as described herein, the communication systems 202 may transmit data to the GCS 106 that is associated with the energy management system 102, such as a current mode of operation and/or other parameters associated with selecting the mode of operation (e.g., airspeed, power, altitude, etc.).

The aircraft 100 may include an FMS 204 that may receive and/or generate one or more flight plan data structures (i.e., flight plan data) that the aircraft 100 may use for navigation. A flight plan data structure may include a sequence of waypoints that each indicate a target location for the aircraft over time. A waypoint may indicate a three-dimensional location in space, such as a latitude, longitude, and altitude (e.g., in meters). Each of the waypoints in the flight plan data structure may also be associated with additional waypoint data, such as a waypoint time (e.g., a target time of arrival at the waypoint) and/or a waypoint speed (e.g., a target airspeed in knots or kilometers per hour). In some implementations, a flight plan data structure may include other trajectory definitions, such as trajectories defined by splines (e.g., instead of discrete waypoints) and/or a Dubins path (e.g., a combination of a straight line and circle arcs). In some implementations, the flight plan data structure may include additional flight parameters, such as a desired flap position. The flight plan data structure may be generated for different phases of flight, such as departure, climb, cruise, descent, approach, and missed approach. In some implementations, a flight plan data structure may specify a flight pattern (e.g., near an airport, landing, departing, etc.).

A remote operator, autopilot 104, and/or onboard operator/pilot may control the aircraft 100 according to the generated flight plan data structure. For example, a flight plan data structure may be used to land the aircraft 100, take off from a runway, navigate en route to a destination, perform a missed approach, and/or hold the aircraft 100 in a defined space. In some implementations, the flight plan may be displayed to the remote operator on a display so that the remote operator may follow the flight plan.

The flight plan data structure may be generated in a variety of ways. In some implementations, the flight plan data structure may be manually constructed. In some implementations, the flight plan data structure may be automatically generated. The flight plan data structure may be generated prior to flight or during flight. In some implementations, the flight plan data structure may be modified in flight. For example, the flight plan data structure may be manually or automatically modified during flight based on detected scenarios. The FMS/GCS 204, 106 may acquire a variety of types of data for use in generating a flight plan data structure. Example data may include, but is not limited to, navigation data (e.g., GNSS data and AHRS data), static data from databases (e.g., an obstacle database and/or terrain database), broadcasted data (e.g., weather forecasts and notices to airmen), and manually acquired/input data (e.g., operator vision, radio communications, and air traffic control inputs).

The aircraft 100 includes a flight control system 206 that generates actuator setpoints (e.g., "actuator commands" or "actuator setpoint commands") based on a flight plan data structure and current operating conditions. The flight control system 206 may include a guidance module 220 and an autopilot system 104. The flight control system 206 illustrated and described herein is only an example flight control system 206. As such, other flight control systems including additional/alternative components may be implemented according to the techniques of the present disclosure.

The flight control system 206 may generate actuator setpoints that control the aircraft 100. For example, the flight control system 206 may generate setpoints that control the actuators 208 and the engine(s) (e.g., via an engine controller). The flight control system 206 may control the aircraft 100 according to remote operator inputs from the GCS operator controls 902 and/or flight plan data generated by the FMS 204. For example, the flight control system 206 may control the aircraft 100 according to flight plan data that is generated remotely by the GCS 106 and/or locally by the FMS 204.

The flight control system 206 may include a guidance module 220. In some implementations, the guidance module 220 may receive the flight plan data structure and additional information regarding the state of the aircraft 100, such as a current location (e.g., a latitude/longitude/altitude), velocity, and aircraft attitude information. Based on the received information, the guidance module 220 may generate autopilot input setpoint values (e.g., autopilot commands) for the flight control system 206. Example setpoint values may include a desired airspeed setpoint and a desired altitude setpoint, along with other possible setpoints (e.g., a heading setpoint, a roll setpoint, etc.). In some cases, the desired setpoint values may be referred to as "target setpoint values." In some cases, the desired/target setpoints may also be referred to as "autopilot commands."

The flight control system 206 may include an autopilot system 104 that controls the aircraft 100 based on autopilot input setpoints received from the guidance module 220. For example, the autopilot system 104 may output actuator setpoints that control actuators 208 based on the received autopilot input setpoints. Example actuators described herein may include power lever actuators 208-1 for one or more engines. Other example actuators may include pitch actuators 208-2 (e.g., an elevator actuator). In some implementations, the aircraft 100 may include an engine controller that controls one or more engines, such as turboprop engines or other engine types. The engine controller may control the engine(s) based on received engine commands, such as engine commands generated based on the power lever position (e.g., power lever angle). For example, the engine controller may control fuel and other engine parameters to control the engines according to the received engine commands. In some implementations, the engine controller may include a full authority digital engine control (FADEC) that controls the engines. Example engines may include, but are not limited to, a piston engine, turboprop, turbofan, turbojet, jet, and turboshaft. In some implementations, the aircraft 100 may include one or more electric motors (e.g., fixed, tilting, etc.). In some implementations, the aircraft 100 may include a propeller system. Example aircraft may include fixed wing aircraft (e.g., see FIG. 1), rotorcraft, vertical takeoff and landing aircraft (VTOL), and hybrid configurations, such as tilt-wing aircraft and electrical vertical takeoff and landing aircraft (eVTOL).

The flight control system 206 may receive flight plan data from the FMS 204 and/or be controlled by a local/remote operator. In some cases, the flight control system 206 receives data (e.g., a flight plan data structure) from the FMS 204. In these cases, the autopilot 104 controls the aircraft 100 according to the data received from the FMS 204. In some cases, a remote operator may use remote operator controls 902 (e.g., on a control panel/screen at the GCS 106) to generate control inputs for the autopilot 104. For example, the autopilot 104 may receive commands from the remote operator controls 902 that provide the autopilot 104 with at least one of: 1) a desired altitude, 2) a desired airspeed, 3) a desired heading, 4) yaw damper (e.g., to coordinate the turns with the rudder), 5) a desired climb/descent rate, and 6) a desired holding pattern. The autopilot 104 may control the aircraft 100 according to the received commands.

The aircraft 100 may include a plurality of control surfaces that may be controlled by the actuators 208. Example control surfaces may include, but are not limited to, ailerons, tabs, flaps, rudders, elevators, stabilizers, spoilers, elevons, elerudders, ruddervators, flaperons, landing gears, and brakes for fixed-wing aircraft. Rotorcraft may include other controls/surfaces (e.g., rotor collective, cyclic, and tail rotor). The aircraft 100 can include actuators/linkages that control the control surfaces based on the commands/setpoints generated by the remote operator controls 902 and/or the autopilot 104. The actuators 208 and linkages may vary, depending on the type of aircraft.

The GCS/aircraft 106, 100 may include interfaces for the remote/onboard operator/pilot, referred to herein as operator input/output (I/O) devices 210, 900 and/or HMI. The operator I/O 210, 900 may include operator controls 222, 902, one or more displays 224, 904, and additional interfaces 226, 906. The operator controls 222, 902 include devices used by the remote/onboard operator to control the aircraft 100, such as a flight yoke, power lever, manual buttons/switches, and other controls. The displays 224, 904 can display one or more graphical user interfaces (GUIs). Additional interfaces 226, 906 may include audio interfaces (e.g., speakers, headphones, microphones, etc.), haptic feedback, and other I/O devices, such as readouts and gauges.

The displays 224, 904 may include a variety of display technologies and form factors including, but not limited to: 1) a display screen (i.e., monitor), 2) a HUD, 3) a helmet mounted display, 4) a head mounted display, 5) augmented reality glasses/goggles, and/or 6) a standalone computing device (e.g., a tablet computing device). The displays 224, 904 may provide different types of functionality. In some implementations, a display may be referred to as a primary flight display (PFD) or a multi-function display (MFD). The GCS/aircraft 106, 100 may include different types of displays that include GUIs that are rendered based on a variety of data sources.

The aircraft 100 may communicate with the GCS 106 and ATC 112 through different communications pathways (e.g., radio links, cellular, 5G, satellite, Wi-Fi, etc.). The aircraft 100 may communicate a variety of types of information, such as aircraft health, current location, intension, traffic, weather information, mode of operation (e.g., normal, underpower, or underspeed), other energy management system data, and other data. The remote operator may issue commands to the aircraft 100 via the communication pathway. The aircraft 100 may be an optionally piloted vehicle. In this case, the aircraft 100 may have an operator/pilot on the aircraft 100. The onboard operator/pilot responsibilities may include monitoring of the autonomous systems and communications. The operator/pilot may have the ability to take control of the vehicle in the event of a failure of the autoflight systems or the loss of communications.

FIG. 3 illustrates an example flight control system 206 and actuators 208. In FIG. 3, the guidance module 220 generates a desired airspeed setpoint and a desired altitude setpoint based on flight plan data. The autopilot 104 may generate actuator setpoints for actuators 208 that control airspeed, altitude, and other aircraft parameters based on the desired airspeed setpoint, desired altitude setpoint, actual airspeed, and actual altitude.

The autopilot 104 may generate a power setpoint (e.g., an engine power/thrust setting) that controls engine power output. In some implementations, a power lever actuator 208-1 may actuate a power lever based on the power setpoint. For example, the power lever actuator 208-1 may actuate the power lever position (e.g., power lever angle) to match the power setpoint. In some cases, the power setpoint may be referred to as a "throttle setpoint" or "throttle command."

The autopilot 104 may generate a pitch setpoint that controls the pitch of the aircraft 100. In some implementations, a pitch actuator 208-2 may control one or more pitch control surfaces that control aircraft pitch based on the pitch setpoint. For example, the pitch actuator 208-2 may actuate a pitch control surface to match the pitch setpoint. In cases where the aircraft 100 includes an elevator control surface, the pitch setpoint may be referred to as an "elevator position setpoint" or "elevator position command." In these cases, an elevator actuator may acuate an elevator control surface based on the elevator position setpoint/command. The autopilot 104 may also generate additional actuator setpoints that cause other actuators 208-3 to control other aircraft surfaces/components.

Although the energy management system 102 may be implemented in an unmanned aircraft, in some implementations, the energy management system 102 may be implemented in a manned aircraft. For example, a manned aircraft autopilot may implement the energy management system 102 in a similar manner described herein with respect to an unmanned aircraft. In these examples, an onboard pilot may enter commands (e.g., setpoints) or other parameters manually, such as altitude and airspeed setpoints, climb/sink rates, a flight plan, or other data described herein.

Figure 4:
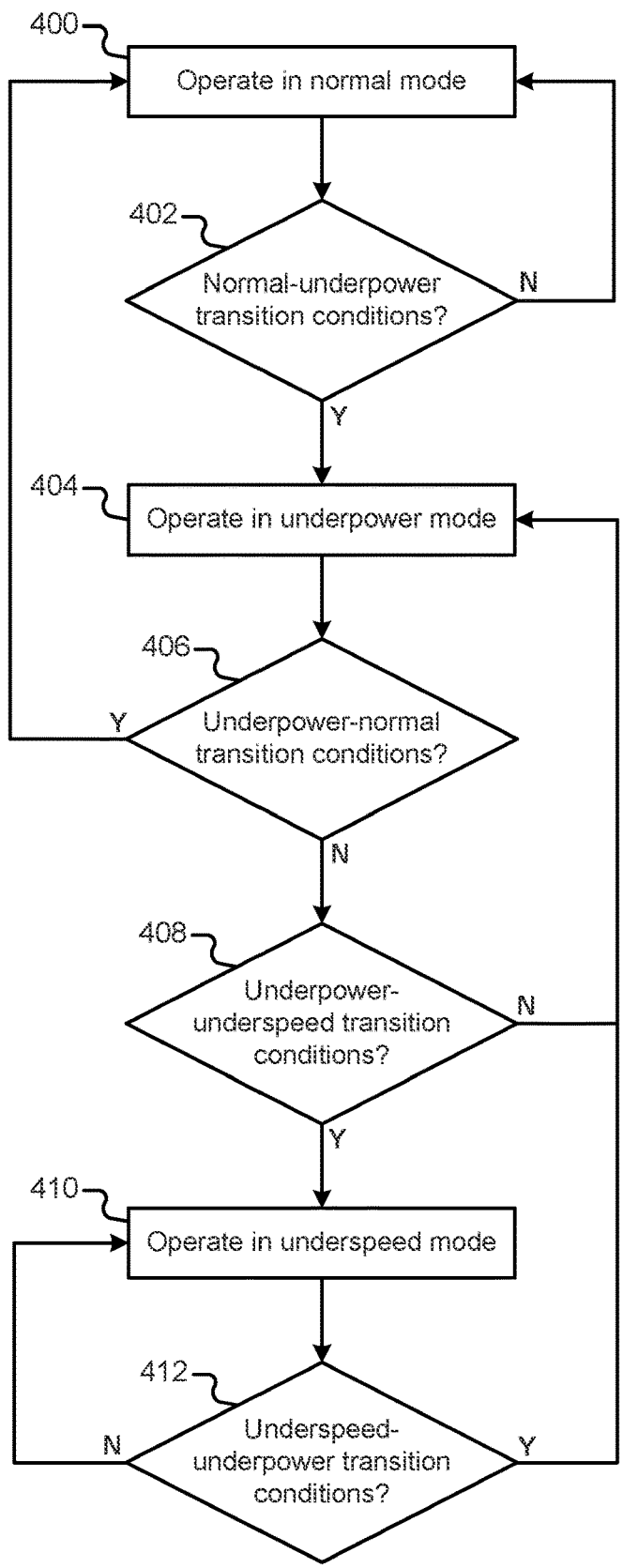
FIG. 4 illustrates a method that describes example operations performed by the autopilot system (e.g., the energy management system) of the present disclosure.

FIG. 4 illustrates a method that describes example operations performed by the autopilot system 104 (e.g., the energy management system 102) of the present disclosure. In the method of FIG. 4, the autopilot 104 may operate in a normal mode, an underpower mode, or an underspeed mode. The autopilot 104 may control aircraft power and aircraft pitch based on the mode of operation. For example, the manner in which the autopilot 104 controls the aircraft power and the aircraft pitch may depend on the aircraft's mode of operation, altitude, airspeed, altitude setpoint, and/or airspeed setpoint. The autopilot 104 may transition between the modes in response to detection of mode transition conditions, such as various airspeed conditions and altitude conditions, which may depend on the current mode of operation.

Figure 5:
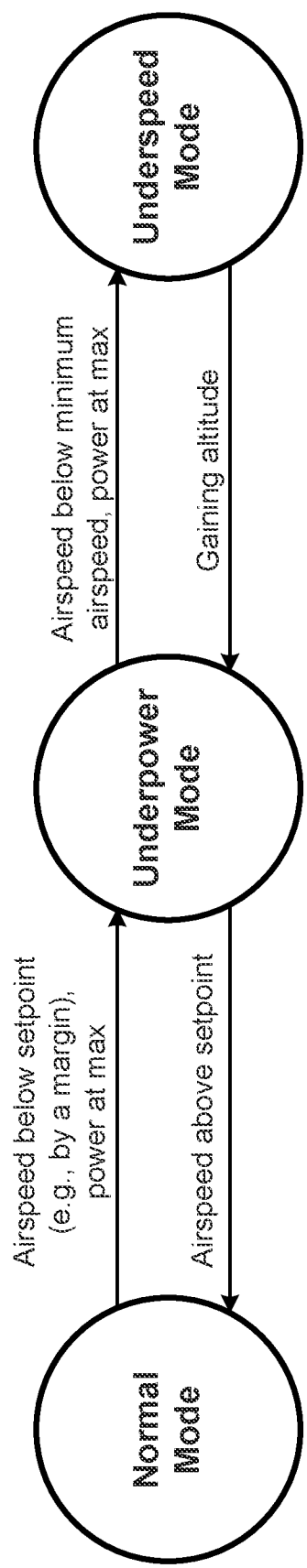
FIG. 5 illustrates an example state diagram including three modes of aircraft operation along with example transition conditions.
Figure 6:
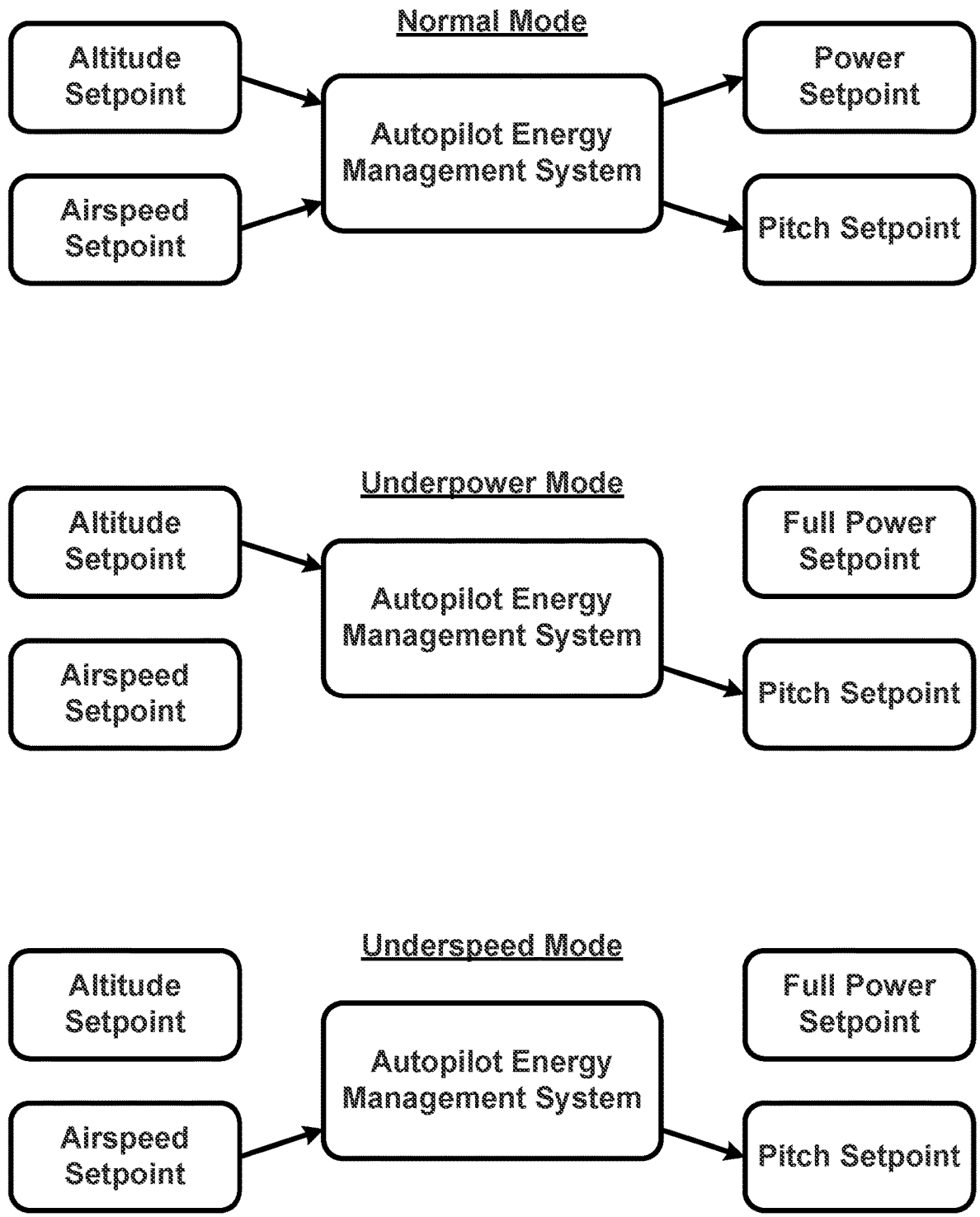
FIG. 6 illustrates diagrams that describe autopilot operation in different modes of operation.

FIG. 5 illustrates an example state diagram including the three modes of operation, along with example transition conditions. FIG. 6 includes diagrams that also describe autopilot operation in the different modes. For example, FIG. 6 illustrates the mapping of inputs to outputs for each mode.

In block 400, the autopilot 104 operates in the normal mode. In the normal mode, the autopilot 104 may control the power setpoint and the pitch setpoint to maintain the desired altitude setpoint and the airspeed setpoint (e.g., defined by a flight plan), as illustrated in FIG. 6. If the current airspeed is less than the airspeed setpoint, the autopilot 104 may increase the power setpoint to increase airspeed. The airspeed setpoint may typically be set to an airspeed that the aircraft 100 may track/maintain, but in some scenarios, the airspeed setpoint may be a value this is not attainable by the aircraft 100. In a specific example, an operator (e.g., remote operator or onboard operator) may want the aircraft to travel "as fast as possible" at the current altitude. In this specific example, the operator may command max speed and expect the aircraft 100 to apply full power/throttle and not reach the airspeed setpoint.

In block 402, the autopilot 104 determines whether normal to underpower transition conditions (i.e., "normal-underpower conditions") exist while operating in the normal mode. An example normal-underpower condition may include a scenario where the aircraft 100 is unable to meet the airspeed setpoint, even at a full power. In some cases, the aircraft 100 may be unable to meet the airspeed setpoint if the flight plan requests an airspeed that is greater than the aircraft 100 may achieve. In some cases, the aircraft 100 may be unable to meet the airspeed setpoint due to other conditions, such as an aircraft malfunction (e.g., aircraft power loss). The autopilot 104 may continue to operate in a normal mode in block 400 while the aircraft is able to meet the airspeed setpoint and the altitude setpoint.

In block 404, the autopilot 104 may transition to operating in the underpower mode in response to detection of normal-underpower conditions, such as an inability to reach the airspeed setpoint. FIG. 5 illustrates an example transition from normal mode to underpower mode in response to operating below the airspeed setpoint (e.g., by a margin, such as a defined airspeed margin).

The autopilot 104 may command full power when operating in the underpower mode. The autopilot 104 may also generate a pitch setpoint that tracks the desired altitude in the underpower mode. FIG. 6 illustrates an example mapping of inputs to outputs for the underpower mode. In FIG. 6, the autopilot 104 provides a full power setpoint and controls the pitch setpoint based on altitude (e.g., tracks altitude).

In block 406, the autopilot 104 determines whether underpower to normal transition conditions (i.e., "underpower-normal conditions") exist while operating in the underpower mode. An example underpower-normal condition may include a scenario where the aircraft 100 reaches/exceeds the airspeed setpoint. For example, while commanding full power in the underpower mode, the aircraft 100 may increase in airspeed and reach/exceed the airspeed setpoint.

The autopilot 104 may return to operating in the normal mode when the aircraft reaches the desired airspeed setpoint. FIG. 5 illustrates a transition from the underpower mode to the normal mode when the airspeed is above the airspeed setpoint. Note that the satisfaction of underpower-normal conditions may indicate that the aircraft 100 is capable of level flight at the airspeed setpoint, so normal operation may resume.

Transitioning between normal and underpower modes may commonly occur. In some implementations, the energy management system 102 may implement setpoint values that prevent transient conditions from triggering a mode switch. For example, the energy management system 102 may implement different setpoint values (e.g., including hysteresis) for transitioning to/from modes. In one example, as illustrated in FIG. 5, transitioning from normal mode to underpower mode may require that airspeed drop below a setpoint by a margin in order to transition into underpower mode, whereas reaching/exceeding the setpoint in the underpower mode may cause a transition back to normal mode. In this example, the setpoint for transitioning from normal mode to underpower mode may be referred to as a "normal-underpower setpoint." Similarly, the setpoint for transitioning from underpower mode to normal mode may be referred to as an "underpower-normal setpoint." In some implementations, the energy management system 102 may also require that the transition conditions be present for a period of time (e.g., seconds or more) before transitioning modes in order to avoid transitions due to transient conditions (e.g., dips/spikes in values). Although different transition values (e.g., setpoint values) are illustrated between normal/underpower mode in FIG. 5, other transition values between other modes may also differ in some implementations.

During underpower operation, when the airspeed setpoint is too high for the aircraft 100 to meet while also maintaining level flight, commanding full power while tracking altitude may provide a more effective control solution than other control schemes. For example, attempting to achieve a high airspeed setpoint by pitching down to gain speed may result in operating at a lower altitude while in some cases still maintaining an airspeed that is less than the high airspeed setpoint. Operating at the lower altitude may be suboptimal, as it does not match operator commands and/or the expectations of other aircraft. Operating in the underpower mode may also provide a better control solution than using a maximum airspeed setpoint, as maximum achievable airspeed may vary among aircraft and may be based on varying environmental conditions. Furthermore, there still may be a risk that the maximum airspeed setpoint is set too high, or may artificially constrain the aircraft if too low. The energy management system 102 of the present disclosure may allow the aircraft to discover its own maximum achievable speed without needing any hard-coded guesses about aircraft performance.

In block 408, the autopilot 104 determines whether underpower to underspeed transition conditions (i.e., "underpower-underspeed conditions") exist while operating in the underpower mode. An example underpower-underspeed condition may include a scenario where the aircraft 100 falls to/below a minimum airspeed threshold (e.g., at or near a stall speed). For example, underpower-underspeed conditions may be satisfied if, while commanding full power in the underpower mode, the airspeed continues to decrease towards the minimum airspeed threshold. This scenario may occur when the aircraft 100 is unable to generate enough power to maintain an airspeed above the minimum airspeed threshold due to a malfunction in the aircraft propulsion system. FIG. 5 illustrates an example transition from the underpower mode to the underspeed mode when the power setpoint is set to max and the airspeed drops below a minimum airspeed threshold. In some implementations, the minimum airspeed threshold may be a constant value selected as a conservative minimum safe speed across operating conditions. In some implementations, the minimum airspeed threshold may be a function of operating conditions (e.g., bank angle, flap position, aircraft weight, etc.).

In block 410, the autopilot 104 may operate in the underspeed mode. In the underspeed mode, the autopilot 104 may command full power and give up altitude in order to maintain a speed that is greater than the minimum airspeed threshold. For example, the autopilot 104 may maintain the full power setpoint and control the pitch setpoint to descend at a rate that maintains an airspeed that is greater than the minimum airspeed threshold. FIG. 6 illustrates an example mapping of inputs to outputs for the underspeed mode. In FIG. 6, the autopilot 104 provides a full power setpoint and controls the pitch setpoint in response to the airspeed setpoint (e.g., above the minimum airspeed threshold).

In some implementations, the autopilot 104 may operate in the underspeed mode in a manner that minimizes the sink rate of the aircraft 104 given the available power. In some cases, the aircraft 104 may have an operating, but underperforming, propulsion system. In other cases, the underspeed mode may also include scenarios where there is a complete loss of power. Accordingly, underspeed mode may be used to control the aircraft 100 during insufficient power scenarios and complete loss of power scenarios.

During underspeed operation, when the aircraft 100 may not maintain level flight at above the stall speed, commanding full power and giving up altitude to maintain airspeed may provide a more effective control solution than other control schemes. For example, the underspeed mode may provide a better control solution than a system that attempts to regain lost altitude, as the aircraft may be unable to regain the lost altitude and may stall in the process of attempting to regain lost altitude (e.g., while pitching up). Additionally, the underspeed mode may provide a better control solution than defining a minimum airspeed setpoint to prevent a stall. For example, as outlined above, in the case of an engine failure, the problem is not that the airspeed setpoint is too low, it is that the aircraft 100 is not physically capable of maintaining that airspeed setpoint while also trying to track altitude.

In block 412, the autopilot determines whether underspeed to underpower transition conditions (i.e., "underspeed-underpower conditions") exist while operating in the underspeed mode. An example underspeed-underpower condition may include a scenario where the aircraft exceeds the minimum airspeed threshold by a specified amount. Additionally, or alternatively, an underspeed-underpower condition may include a positive vertical ascent rate, which may indicate that the aircraft is capable of maintaining altitude at a speed safely above the stall speed. Additionally, or alternatively, an underspeed-underpower condition may include the aircraft 100 exceeding an altitude value, such as the altitude setpoint or other specified altitude value. In one example, while commanding full power in the underspeed mode and giving up altitude to maintain airspeed, the aircraft propulsion system may experience restored operation to a sufficient level to increase speed and begin gaining altitude. In this case, the autopilot 104 may transition back to operating in the underpower mode in block 404. FIG. 5 illustrates an example transition from the underspeed mode to the underpower mode when the aircraft begins gaining altitude.

In some implementations, the autopilot 104 may include additional transition conditions that should be satisfied for transitions between modes. For example, in some implementations, the transition conditions should be present for a threshold amount of time (e.g., a specified number of seconds) before transitioning. Requiring that the transition conditions be present for a period of time (e.g., persistently) may reduce the likelihood of false positives and prevent rapid cycling between states. The additional transition conditions may vary, depending on the type of transition.

Although FIGS. 4-5 do not illustrate a direct transition from normal to underspeed, in some implementations, an energy management system 102 may include a normal to underspeed transition. For example, if airspeed is below the minimum airspeed persistently, the energy management system 102 may switch to the underspeed state to prevent a stall.

Figure 7:
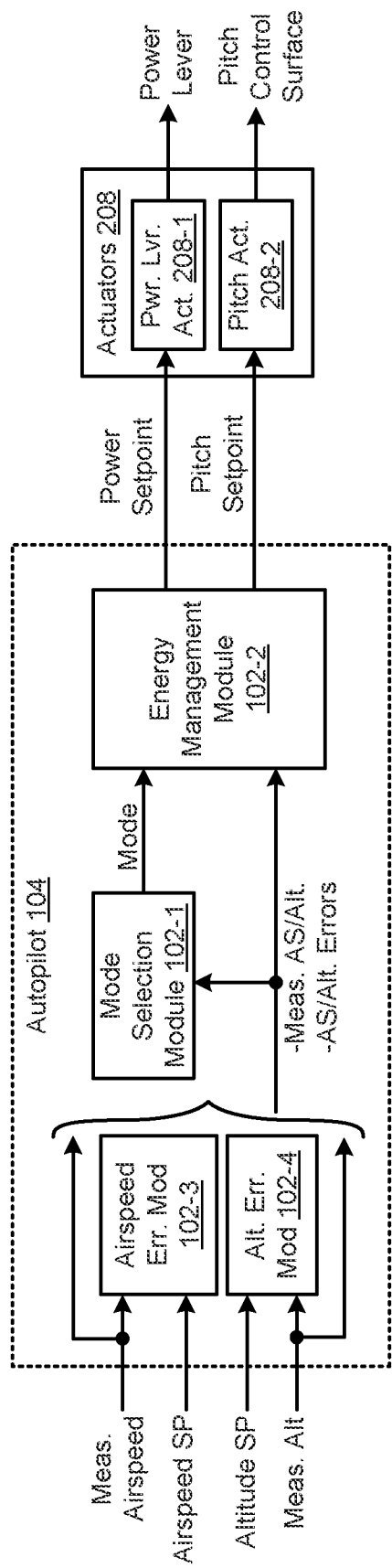
FIGS. 7-8 illustrate example functional block diagrams of an autopilot system that implements the energy management system of the present disclosure.
Figure 8:
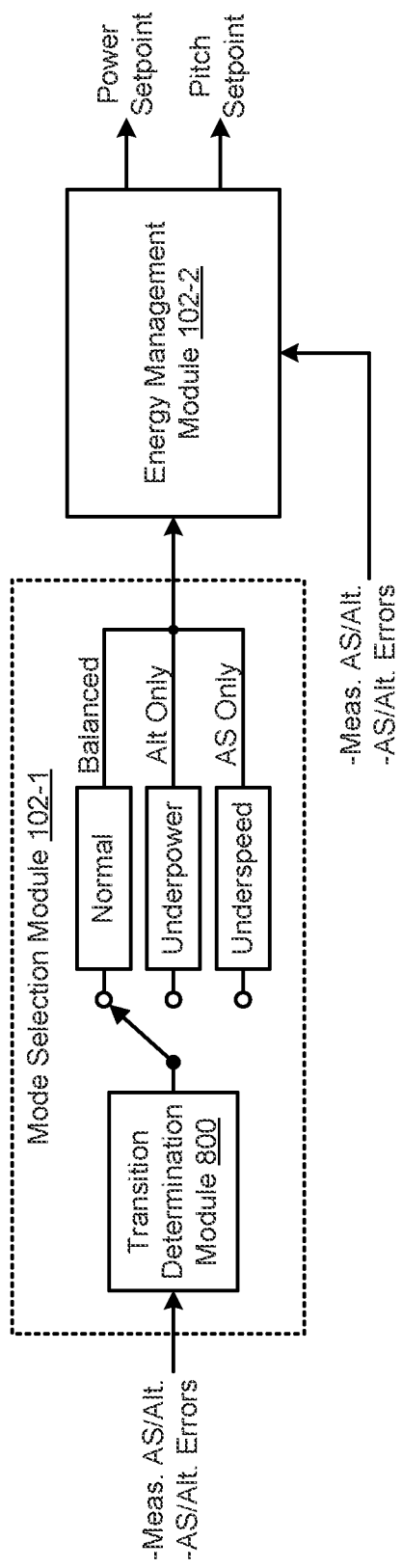

FIGS. 7-8 illustrate example functional block diagrams of an autopilot system 104 that implements the energy management system 102 of the present disclosure. The autopilot 104 may receive measured airspeed, measured altitude, the airspeed setpoint, and the altitude setpoint. The autopilot 104 may include an airspeed error module 102-3 and an altitude error module 102-4 that determine an airspeed (AS) error value and an altitude (Alt.) error value, respectively. The mode selection module 102-1 and the energy management module 102-2 may use the measured values, setpoint values, and/or error values to implement the functionality associated with the energy management system 102, such as mode determination, power setpoint generation, and/or pitch setpoint generation.

The mode selection module 102-1 may select the mode of operation as described herein. For example, the mode selection module 102-1 may select from the normal mode, underpower mode, or underspeed mode based on the conditions described herein. The mode selection module 102-1 may transition between the modes of operation in response to detection of the transition conditions described herein. For example, the mode selection module 102-1 may include a transition determination module 800 that determines the mode of operation based on the measured values, setpoint values, and/or error values.

The energy management module 102-2 may generate the power setpoint and the pitch setpoint based on the current aircraft parameters (e.g., measured values, setpoint values, and/or error values) and the mode of operation. The energy management module 102-2 may include additional modules that output the power setpoint and pitch setpoint based on the illustrated inputs. For example, the energy management module 102-2 may include a power setpoint generation module and a pitch setpoint generation module. In some implementations, the energy management module 102-2 (e.g., included modules) may implement PID controls that generate the setpoint values based on the received inputs and/or calculated errors based on the received inputs (e.g., potential energy error and/or kinetic energy error). Example equations are included below.

It may be assumed during normal operation that the energy management system 102 may control airspeed and altitude simultaneously using the power lever (e.g., throttle) and pitch control surface(s) (e.g., elevator). For example, the autopilot 104 may use power (e.g., throttle) to minimize total energy error and use pitch to minimize the energy balance error. Equations for those two quantities are included below. In some implementations, the energy management system 102 may compute the equation values multiple times per second. The energy management system 102 may include PID controls that output the power setpoint command and pitch setpoint command based on total energy error and energy balance error.

$$potential\_energy\_error = g*(altitude\_setpoint - altitude)$$

$$kinetic\_energy\_error = 0.5*(true\_airspeed\_setpoint^2 - true\_airspeed^2)$$

$$total\_energy\_error = potential\_energy\_error + kinetic\_energy\_error$$

$$energy\_balance\_error = weight\_PE*potential\_energy\_error - weight\_KE*kinetic\_energy\_error$$

Figure 10A:
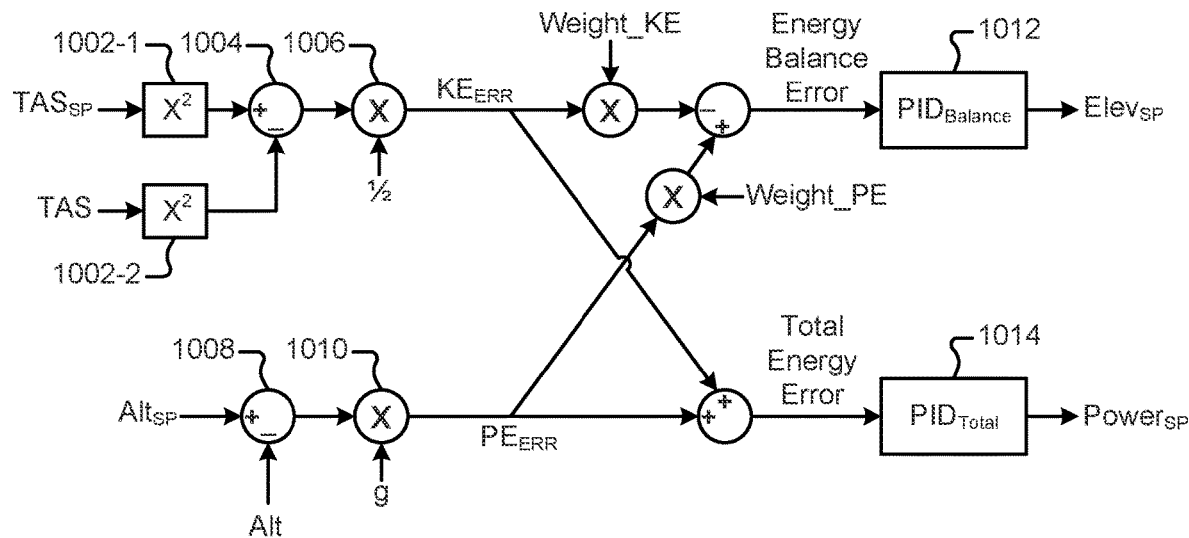
FIGS. 10A-10C illustrate control block diagrams for an example energy management module.
Figure 10B:
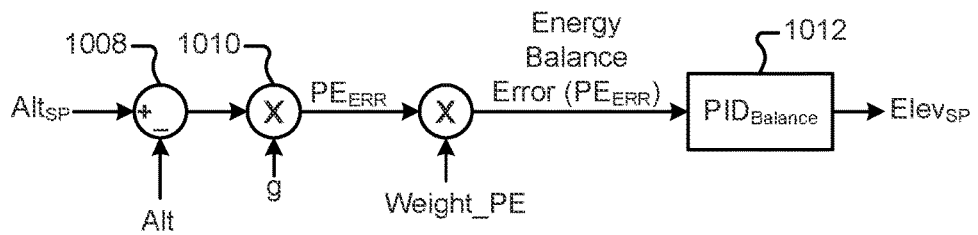
Figure 10C:
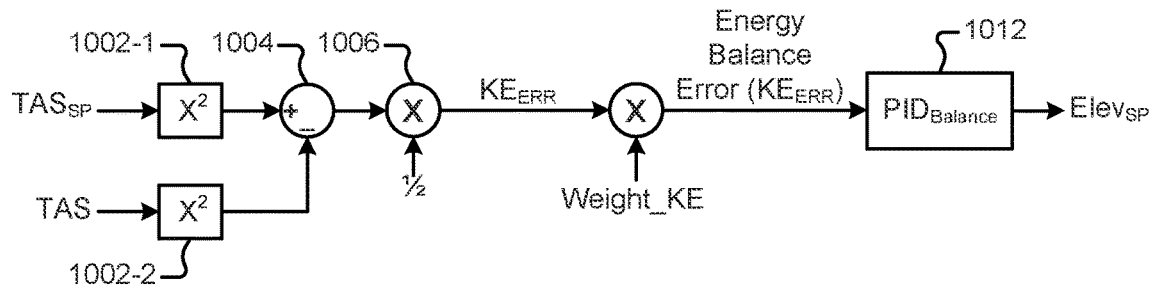

FIGS. 10A-10C illustrate control diagrams for implementing example features of an energy management module 102-2. FIG. 10A illustrates operation of the energy management module 102-2 in the normal mode. FIG. 10B illustrates operation of the energy management module 102-2 in the underpower mode. FIG. 10C illustrates operation of the energy management module 102-2 in the underspeed mode.

In FIG. 10A, the energy management module 102-2 receives a determined true airspeed value (TAS) and a true airspeed setpoint ($TAS_{SP}$). The squaring blocks 1002-1, 1002-2, summing block 1004, and ½ multiplication block 1006 generate a kinetic energy error value ($KE_{ERR}$). The energy management module 102-2 also receives a determined altitude value (Alt) and an altitude setpoint value ($Alt_{SP}$). The energy management module 102-2 includes a summing block 1008 and a multiplication block 1010. The multiplication block 1010 multiplies the altitude error by a gravity value (g) to generate a potential energy error value ($PE_{ERR}$).

The kinetic energy error value and the potential energy error value are multiplied by Weight_KE and Weight_PE weighting values. The weighting values may dictate how much importance the controller places on tracking airspeed vs. tracking altitude. For example, if Weight_KE is large relative to Weight_PE, the system may not tolerate large airspeed errors and may sacrifice altitude tracking to better track airspeed. As another example, if Weight_PE is large relative to Weight_KE, the system may not tolerate large altitude errors and may sacrifice airspeed tracking to better track altitude.

The energy management module 102-2 includes summing blocks that determine an energy balance error value and a total energy error value. An energy balance PID controller ($PID_{Balance}$) 1012 determines an elevator setpoint ($Elev_{SP}$). A total energy error PID controller ($PID_{Total}$) 1014 determines a power setpoint ($Power_{SP}$).

In FIG. 10B, the energy management module 102-2 controls the elevator setpoint based on the determined altitude and the altitude setpoint in the underpower mode. In the underpower mode, the energy management module 102-2 may control the elevator setpoint without regard/reference to the true airspeed value and true airspeed setpoint. In FIG. 10C, the energy management module 102-2 controls the elevator setpoint based on the determined true airspeed and the true airspeed setpoint in the underspeed mode. In the underspeed mode, the energy management module 102-2 may control the elevator setpoint without regard/reference to the altitude value and altitude setpoint. In some implementations, the algorithm and gains for controlling energy balance in the underpower and underspeed modes may be the same as the normal mode. In these implementations, the kinetic or potential energy terms into the energy balance may be 0.

Figure 9:
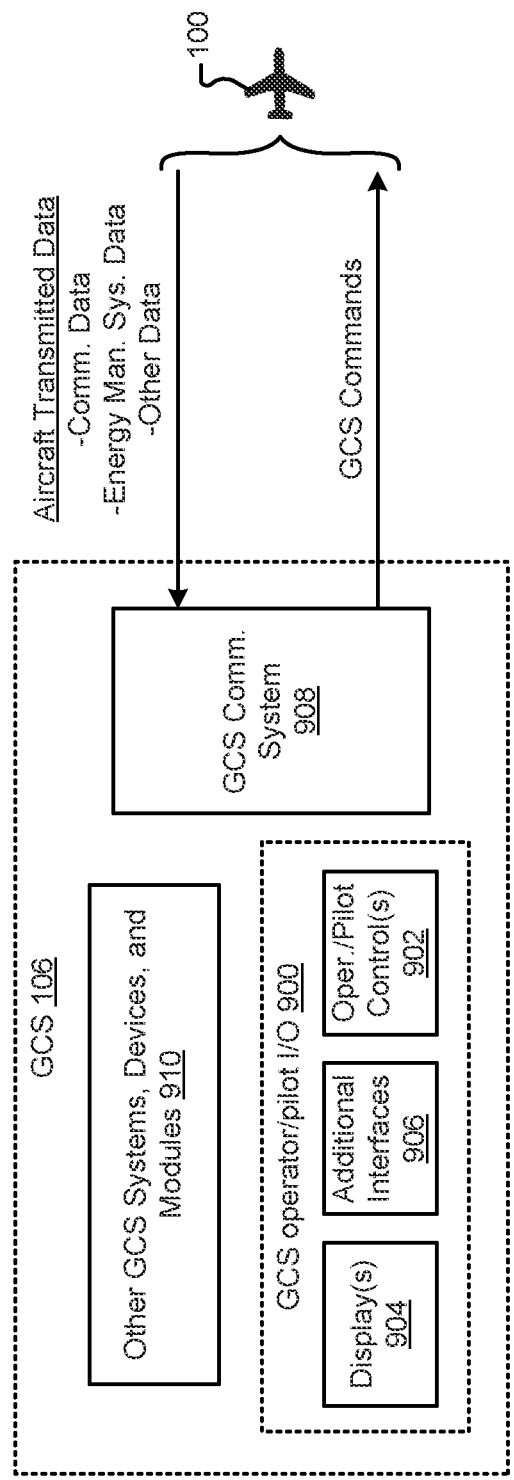
FIG. 9 illustrates an example ground control station (GCS) in communication with an aircraft.

FIG. 9 illustrates an example GCS 106 that includes GCS operator I/O 900 described herein. The GCS 106 also includes a GCS communication system 908 that communicates with the aircraft 100. For example, the GCS 106 may communicate with the aircraft 100 via a data connection and/or via a radio relay. The GCS 106 may receive data acquired by the aircraft 100 (e.g., navigation data, comm. data, and other data).

The GCS 106 may monitor the aircraft 100 and/or control operation of the aircraft 100. The GCS 106 may send commands (e.g., operator/autopilot commands) to the aircraft 100 that control the aircraft. The GCS 106 includes other GCS systems, devices, and modules 910 that provide the functionality described herein, along with additional functionality associated with the GCS 106. For example, the other GCS systems, devices, and modules 910 may provide path planning functionality and other flight management system functionality for the aircraft 100.

In some implementations, the GCS 106 may include components (e.g., operator I/O) that are dedicated to generating an energy management system interface. For example, the GCS 106 may include one or more displays and/or operator controls that are dedicated to displaying energy management system data, such as a mode of operation, along with measured values, setpoint values, and/or error values associated with determining the mode of operation. In some implementations, the energy management system interface may be implemented on multi-use components that provide additional functionality in the GCS 106 for other operations.

Functionality associated with an example aircraft 100 is illustrated and described herein. The functionality illustrated and described herein is only example functionality. As such, aircraft having additional/alternative functionality may implement the energy management system 102 described herein. For example, aircraft including additional/alternative sensors (e.g., cameras, LIDAR, radar, etc.) and computing functionality may implement the energy management system 102. In some implementations, autonomous aircraft (e.g., unmanned aircraft) with components providing varying degrees of autonomy may implement the energy management system 102. In some implementations, traditionally piloted aircraft may be instrumented with components (e.g., sensors, computing devices, etc.) that provide varying degrees of autonomy as well as the energy management system 102 of the present disclosure.

Components of the aircraft 100 and the GCS 106 illustrated herein, such as the systems, modules, and data may represent features included in the aircraft 100 and the GCS 106. The systems, modules, and data described herein may be embodied by electronic hardware, software, firmware, other aircraft avionics, or any combination thereof. Depiction of different components as separate does not necessarily imply whether the components are embodied by common or separate electronic hardware or software components. In some implementations, the components depicted herein may be realized by common electronic hardware and software components. In some implementations, the components depicted herein may be realized by separate electronic hardware and software components.

The electronic hardware and software components may include, but are not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology, or any other memory components.

Memory components may include (e.g., store) data described herein. Memory components may also include instructions that may be executed by one or more processing units. For example, memory may include computer-readable instructions that, when executed by one or more processing units, cause the one or more processing units to perform the various functions attributed to the systems/modules described herein. The I/O components may refer to electronic/mechanical hardware and software that provides communication with a variety of different devices (e.g., displays, controls, etc.). For example, the I/O components may provide communication between other devices and the one or more processing units and memory components.

The systems, modules, and other components included in the aircraft 100 and GCS 106 described herein may be implemented by hardware/software components (e.g., one or more computing devices) that provide the described functionality. In some implementations, the various hardware components (e.g., electrical and/or mechanical hardware components) and software components may be retrofitted onto an existing aircraft in order to provide the aircraft functionality described herein. Additionally, or alternatively, the various hardware/software components may be integrated into the aircraft during manufacture. The functional block diagrams illustrated herein are meant to represent example functionality associated with the aircraft 100, GCS 106, and other systems described herein. As such, the aircraft 100, GCS 106, and other systems may be implemented in a variety of different ways with different hardware/software configurations. The energy management system 102 may be implemented on one or more of the existing aircraft computers. Similarly, features of the GCS 106 may be implemented on one or more existing GCS computers. In some implementations, the energy management system functionality described herein may be provided as software for implementation on a new/retrofitted aircraft. For example, the energy management system functionality may be provided as a computer-readable medium including instructions that cause the computing devices in the aircraft 100 and/or GCS 106 to provide the energy management system functionality.

What is claimed is:

1. A non-transitory computer-readable medium comprising computer-executable instructions configured to cause one or more processing units of an aircraft to:
    generate, in a normal mode, an aircraft power setpoint and an aircraft pitch setpoint based on a desired airspeed setpoint and a desired altitude setpoint, wherein the aircraft power setpoint controls aircraft engine power output, and wherein the aircraft pitch setpoint controls aircraft pitch;
    transition from the normal mode to an underpower mode when the aircraft is unable to maintain the desired airspeed setpoint;
    set, in the underpower mode, the aircraft power setpoint to a full power setting;
    update, in the underpower mode, the aircraft pitch setpoint based on the desired altitude setpoint;
    transition from the underpower mode to an underspeed mode when the aircraft airspeed is less than an airspeed threshold value while the aircraft power setpoint is set to the full power setting;
    maintain, in the underspeed mode, the aircraft power setpoint at the full power setting;
    update, in the underspeed mode, the aircraft pitch setpoint based on the desired airspeed setpoint; and
    control the aircraft based on at least one of: the updated aircraft pitch setpoint, the desired airspeed setpoint, the aircraft power setpoint, or the desired altitude setpoint.

2. The computer-readable medium of claim 1, further comprising instructions that cause the one or more processing units to generate the desired airspeed setpoint and the desired altitude setpoint based on a flight plan data structure that includes waypoints that each indicate a target location for the aircraft.

3. The computer-readable medium of claim 1, wherein the aircraft is an unmanned aircraft.

4. The computer-readable medium of claim 1, further comprising instructions that cause the one or more processing units to transition from the normal mode to the underpower mode in response to the aircraft airspeed dropping to less than the desired airspeed setpoint while the aircraft power setpoint is set to the full power setting.

5. The computer-readable medium of claim 1, further comprising instructions that cause the one or more processing units to transition from the underpower mode back to the normal mode in response to reaching the desired airspeed setpoint.

6. The computer-readable medium of claim 1, wherein the airspeed threshold value is based on a stall speed value.

7. The computer-readable medium of claim 1, further comprising instructions that cause the one or more processing units to transition from the underspeed mode back to the underpower mode in response to the aircraft exceeding a minimum airspeed threshold different from the airspeed threshold.

8. The computer-readable medium of claim 1, further comprising instructions that cause the one or more processing units to transition from the underspeed mode back to the underpower mode in response to the aircraft achieving a positive vertical ascent rate.

9. The computer-readable medium of claim 1, further comprising instructions that cause the one or more processing units to transition from the underspeed mode back to the underpower mode in response to the aircraft reaching the desired altitude setpoint.

10. The computer-readable medium of claim 1, further comprising instructions that cause the one or more processing units to:
    maintain the full power setting in the underpower mode without reference to the airspeed setpoint; and
    generate, in the underpower mode, the aircraft pitch setpoint based on the desired altitude setpoint without reference to the airspeed setpoint.

11. The computer-readable medium of claim 1, further comprising instructions that cause the one or more processing units to:
- maintain the full power setting in the underspeed mode without reference to the airspeed setpoint; and
- control, in the underspeed mode, the aircraft pitch setpoint based on the desired airspeed setpoint without reference to the altitude setpoint.

12. A method comprising:
- generating, in a normal mode, an aircraft power setpoint and an aircraft pitch setpoint for an aircraft based on a desired airspeed setpoint and a desired altitude setpoint, wherein the aircraft power setpoint controls aircraft engine power output, and wherein the aircraft pitch setpoint controls aircraft pitch;
- transitioning from the normal mode to an underpower mode when the aircraft is unable to maintain the desired airspeed setpoint;
- setting, in the underpower mode, the aircraft power setpoint to a full power setting;
- updating, in the underpower mode, the aircraft pitch setpoint based on the desired altitude setpoint;
- transitioning from the underpower mode to an underspeed mode when the aircraft airspeed is less than an airspeed threshold value while the aircraft power setpoint is set to the full power setting;
- maintaining, in the underspeed mode, the aircraft power setpoint at the full power setting; and
- updating, in the underspeed mode, the aircraft pitch setpoint based on the desired airspeed setpoint; and
- controlling the aircraft based on at least one of: the updated aircraft pitch setpoint, the desired airspeed setpoint, the aircraft power setpoint, or the desired altitude setpoint.

13. The method of claim 12, further comprising generating the desired airspeed setpoint and the desired altitude setpoint based on a flight plan data structure that includes waypoints that each indicate a target location for the aircraft.

14. The method of claim 12, wherein the aircraft is an unmanned aircraft.

15. The method of claim 12, further comprising transitioning from the normal mode to the underpower mode in response to the aircraft airspeed dropping to less than the desired airspeed setpoint while the aircraft power setpoint is set to the full power setting.

16. The method of claim 12, further comprising transitioning from the underpower mode back to the normal mode in response to reaching the desired airspeed setpoint.

17. The method of claim 12, wherein the airspeed threshold value is based on a stall speed value.

18. The method of claim 12, further comprising transitioning from the underspeed mode back to the underpower mode in response to the aircraft exceeding a minimum airspeed threshold different from the airspeed threshold.

19. The method of claim 12, further comprising transitioning from the underspeed mode back to the underpower mode in response to the aircraft achieving a positive vertical ascent rate.

20. The method of claim 12, further comprising transitioning from the underspeed mode back to the underpower mode in response to the aircraft reaching the desired altitude setpoint.

21. The method of claim 12, further comprising:
- maintaining the full power setting in the underpower mode without reference to the airspeed setpoint; and
- updating, in the underpower mode, the aircraft pitch setpoint based on the desired altitude setpoint without reference to the airspeed setpoint.

22. The method of claim 12, further comprising:
- maintaining the full power setting in the underspeed mode without reference to the airspeed setpoint; and
- controlling, in the underspeed mode, the aircraft pitch setpoint based on the desired airspeed setpoint without reference to the altitude setpoint.

* * * * *